US009172559B2

(12) United States Patent
Chen et al.

(10) Patent No.: US 9,172,559 B2
(45) Date of Patent: Oct. 27, 2015

(54) METHOD, APPARATUS, AND NETWORK SYSTEM FOR TERMINAL TO TRAVERSE PRIVATE NETWORK TO COMMUNICATE WITH SERVER IN IMS CORE NETWORK

(71) Applicant: Huawei Technologies Co., Ltd., Shenzhen, Guangdong (CN)

(72) Inventors: Aiping Chen, Hangzhou (CN); Chengjiao Nie, Hangzhou (CN); Zhanbing Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 13/770,014

(22) Filed: Feb. 19, 2013

(65) Prior Publication Data
US 2013/0170502 A1 Jul. 4, 2013

Related U.S. Application Data

(63) Continuation of application No. PCT/CN2011/071659, filed on Mar. 10, 2011.

(30) Foreign Application Priority Data

Aug. 20, 2010 (CN) .......................... 2010 1 0264191

(51) Int. Cl.
*H04L 12/66* (2006.01)
*H04L 29/06* (2006.01)
*H04L 12/46* (2006.01)

(52) U.S. Cl.
CPC ............ *H04L 12/66* (2013.01); *H04L 12/4633* (2013.01); *H04L 12/4641* (2013.01);
(Continued)

(58) Field of Classification Search
CPC ... H04L 12/66; H04L 65/1016; H04L 65/104; H04W 84/045; H04W 88/16
See application file for complete search history.

(56) References Cited

U.S. PATENT DOCUMENTS

2003/0041263 A1 * 2/2003 Devine et al. ................. 713/201
2003/0108041 A1   6/2003 Aysan
(Continued)

FOREIGN PATENT DOCUMENTS

CN    101090362 A    12/2007
CN    101159657 A    4/2008
(Continued)

OTHER PUBLICATIONS

Search report issued in corresponding European patent application No. 11817673.4, dated Jul. 11, 2013, total 8 pages.
(Continued)

*Primary Examiner* — Yong Zhou
(74) *Attorney, Agent, or Firm* — Huawei Technologies Co., Ltd.

(57) ABSTRACT

Embodiments of the present invention provide a method, an apparatus, and a network system for a terminal to traverse a private network to communicate with a server in an IMS core network. The method includes: the terminal sets a source address of service data to be sent as a virtual IP address, sets a destination address of the service data to be sent as an address of an internal network server, and obtains a first service packet, where the virtual IP address is an address allocated by the IMS core network to the terminal, encapsulate the first service packet into a first tunnel packet, and send the first tunnel packet to the security tunnel gateway over a VPN tunnel between the terminal and a security tunnel gateway, then the security tunnel gateway sends the first service packet in the first tunnel packet to the internal network server.

21 Claims, 8 Drawing Sheets

(52) U.S. Cl.
CPC ........ *H04L63/0272* (2013.01); *H04L 65/1016* (2013.01); *H04L 63/0281* (2013.01); *H04L 63/166* (2013.01)

(56) References Cited

U.S. PATENT DOCUMENTS

| | | |
|---|---|---|
| 2004/0085968 A1* | 5/2004 | Chen et al. .................... 370/397 |
| 2005/0008006 A1 | 1/2005 | Schimper |
| 2007/0094723 A1 | 4/2007 | Short et al. |
| 2007/0150946 A1* | 6/2007 | Hanberger et al. ............. 726/15 |
| 2008/0095070 A1* | 4/2008 | Chan et al. .................... 370/254 |
| 2008/0198861 A1* | 8/2008 | Makela ......................... 370/401 |
| 2009/0222906 A1* | 9/2009 | Brandstatter ................... 726/15 |
| 2010/0161960 A1* | 6/2010 | Sadasivan ..................... 713/152 |
| 2011/0216743 A1* | 9/2011 | Bachmann et al. ........... 370/331 |
| 2012/0023241 A1* | 1/2012 | Goel et al. .................... 709/228 |
| 2012/0303949 A1 | 11/2012 | Liu |

FOREIGN PATENT DOCUMENTS

| | | |
|---|---|---|
| CN | 101753634 A | 6/2010 |
| CN | 101778045 A | 7/2010 |
| EP | 1768343 A2 | 3/2007 |
| EP | 1840748 A1 | 10/2007 |

OTHER PUBLICATIONS

Search report and Written opinion issued in corresponding PCT application No. PCT/CN2011/071659, dated Jun. 23, 2011, total 8 pages.

* cited by examiner

METHOD, APPARATUS, AND NETWORK SYSTEM FOR TERMINAL TO TRAVERSE PRIVATE NETWORK TO COMMUNICATE WITH SERVER IN IMS CORE NETWORK

This application is a continuation in of International Application No. PCT/CN2011/071659, filed on Mar. 10, 2011, which claims priority to Chinese Patent Application No. 201010264191.4, filed on Aug. 20, 2010, both of which are hereby incorporated by reference in their entireties.

FIELD OF THE INVENTION

The present invention relates to the field of communications technologies, and in particular, to a method, an apparatus, and a network system for a terminal to traverse a private network to communicate with a server in an Internet Protocol multimedia subsystem (IMS) core network.

BACKGROUND OF THE INVENTION

The Internet Protocol multimedia subsystem (Internet Protocol Media Subsystem, IMS) is an IP-based access-independent network architecture. It is a convergent core network that can be shared by a mobile network and a fixed network. the IMS network is capable of providing convergent services for users that use different access manners such as 2.5G, 3G, WLAN (wireless local area network), and fixed broadband, and is considered as a basis of the next-generation network in the field.

To access the IMS core network, a terminal needs to traverse a private network (for example, an enterprise network accessed by the terminal). Specifically, a private network IP address is used within the enterprise network, and a network address translation (NAT) device is deployed at the edge of the enterprise network. Therefore, the terminal needs to traverse the NAT device and access a server of the IMS core network; or if an application layer proxy server is deployed at the edge of the enterprise network, the terminal needs to traverse the application layer proxy server and access the server of the IMS core network.

The prior art provides a method for traversing a private network. Specifically, an Internet Protocol Security virtual private network (Internet Protocol Security VPN, IPSec VPN) gateway is deployed in each of an enterprise network and an IMS network, so as to set up an IPSec VPN tunnel between the enterprise network and the IMS network by using the deployed IPSec VPN gateways; and routes of terminals in the enterprise network converge to the IPSec VPN gateway in the enterprise network, and the IPSec VPN gateway in the enterprise network performs operations such as encapsulation/decapsulation on service data. Specifically, when a terminal sends service data to the IMS core network, a route of the service data sent by the terminal is modified, and the service data is routed to the IPSec VPN gateway in the enterprise network first. The IPSec VPN gateway encapsulates the service data, and then transmits the service data over the IPSec VPN tunnel to the IPSec VPN gateway in the IMS core network. The IPSec VPN gateway in the core network decapsulates the service data, and sends it to the server in the IMS core network.

In the prior art, the IPSec VPN gateway needs to be deployed in the enterprise network, the data route of the terminal needs to be modified, and great modification of the enterprise network is required.

SUMMARY OF THE INVENTION

Embodiments of the present invention provide a method, an apparatus, and a network system for a terminal to traverse a private network to communicate with a server in an IMS core network, so that the terminal is capable of traversing the private network to communicate with a server in a public network (e.g., the IMS core network) without modifying an enterprise network.

Accordingly, the embodiments of the present invention provide the following technical solutions:

A method for a terminal to traverse a private network to communicate with a server in an Internet Protocol multimedia subsystem (IMS) core network includes:

setting, by the terminal, a source address of service data to be sent as a virtual IP address, setting a destination address of the service data to be sent as an address of an internal network server, and obtaining a first service packet, where the virtual IP address is an address allocated by the IMS core network to the terminal;

encapsulating the first service packet into a first tunnel packet, where a source IP address of the first tunnel packet is an IP address of the terminal, and a destination IP address of the first tunnel packet is an IP address of a security tunnel gateway; and sending the first tunnel packet to the security tunnel gateway over a virtual private network (VPN) tunnel between the terminal and the security tunnel gateway, so that the security tunnel gateway sends the first service packet in the first tunnel packet to the internal network server.

A method for a terminal to traverse a private network to communicate with a server in an IMS core network includes:

receiving, by a security tunnel gateway, a first tunnel packet over a tunnel between the security tunnel gateway and the terminal, where a source IP address of the first tunnel packet is an IP address of the terminal, and a destination IP address of the first tunnel packet is an IP address of the security tunnel gateway;

decapsulating the first tunnel packet to obtain a first service packet, where a source address of the first service packet is a virtual IP address, and a destination address of the first service packet is an address of an internal network server; and sending the first service packet to the internal network server.

A terminal includes a communication capability component, where the communication capability component includes:

a first data converging module, configured to set a source address of service data to be sent as a virtual IP address, set a destination address of the service data to be sent as an address of an internal network server, and obtain a first service packet, where the virtual IP address is an address allocated by an IMS core network to the terminal; and a first tunnel transmission module, configured to encapsulate the first service packet into a first tunnel packet, where a source IP address of the first tunnel packet is an IP address of the terminal, and a destination IP address of the first tunnel packet is an IP address of a security tunnel gateway; and send the first tunnel packet to the security tunnel gateway over a VPN tunnel between the terminal and the security tunnel gateway, so that the security tunnel gateway sends the first service packet in the first tunnel packet to the internal network server.

A security tunnel gateway includes:

a first receiving module, configured to receive a first tunnel packet over a tunnel between the security tunnel gateway and a terminal, where a source IP address of the first tunnel packet is an IP address of the terminal, and a destination IP address of the first tunnel packet is an IP address of the security tunnel gateway;

a decapsulating module, configured to decapsulate the first tunnel packet; and a first sending module, configured to send a first service packet obtained as a result of decapsulation by the decapsulating module to an internal network server, where a source address of the first service packet is a virtual IP address, and a destination address of the first service packet is an address of the internal network server.

A network system includes a security tunnel gateway and an internal network server, where The security tunnel gateway is configured to:
receive a first tunnel packet over a tunnel between the security tunnel gateway and a terminal, where a source IP address of the first tunnel packet is an IP address of the terminal, and a destination IP address of the first tunnel packet is an IP address of the security tunnel gateway;
decapsulate the first tunnel packet to obtain a first service packet, where a source address of the first service packet is a virtual IP address, and a destination address of the first service packet is an address of the internal network server; send the first service packet to the internal network server;
receive a second service packet sent by the internal network server, where a source address of the second service packet is the address of the internal network server, and a destination address of the second service packet is the virtual IP address; encapsulate the second service packet into a second tunnel packet, where a source IP address of the second tunnel packet is the IP address of the security tunnel gateway, and a destination IP address of the second tunnel packet is the IP address of the terminal; and
send the second tunnel packet to the terminal over the tunnel between the security tunnel gateway and the terminal.
The internal network server is configured to receive the first service packet sent by the security tunnel gateway, and send the second service packet to the security tunnel gateway.

In the embodiments of the present invention, the terminal uses the virtual IP address allocated by the IMS core network as an address of communication between the terminal and the internal network server, sets the source address of the service data to be sent as the virtual IP address, sets the destination address of the service data to be sent as an address of the internal network server, and encapsulates the service data into a tunnel packet, and then transmits the tunnel packet to the security tunnel gateway over the tunnel between the terminal and the security tunnel gateway. In this way, the security tunnel gateway is capable of sending the service packet having the virtual IP address as the source address and having the address of the internal network server as the destination address to the internal network server; the service data is transmitted between the internal network server and the terminal by using the security tunnel gateway; and the terminal is capable of traversing the private network to communicate with the server in the public network without modifying the enterprise network that covers the terminal.

In the embodiments of the present invention, the security tunnel gateway serves as an intermediate device, and decapsulates the tunnel packet from the terminal and sends the decapsulated tunnel packet to the internal network server, so as to facilitate service data transmission between the terminal and the server in the IMS core network. In this way, the terminal is capable of traversing the private network to communicate with the server in the public network without modifying the enterprise network that covers the terminal.

BRIEF DESCRIPTION OF THE DRAWINGS

To illustrate the technical solutions in the embodiments of the present invention more clearly, the accompanying drawings required for describing the embodiments are introduced briefly in the following. Apparently, the accompanying drawings in the following description merely show some embodiments of the present invention, and persons of ordinary skill in the art may also derive other drawings from these accompanying drawings without creative efforts.

DETAILED DESCRIPTION OF THE EMBODIMENTS

Figure 1A:
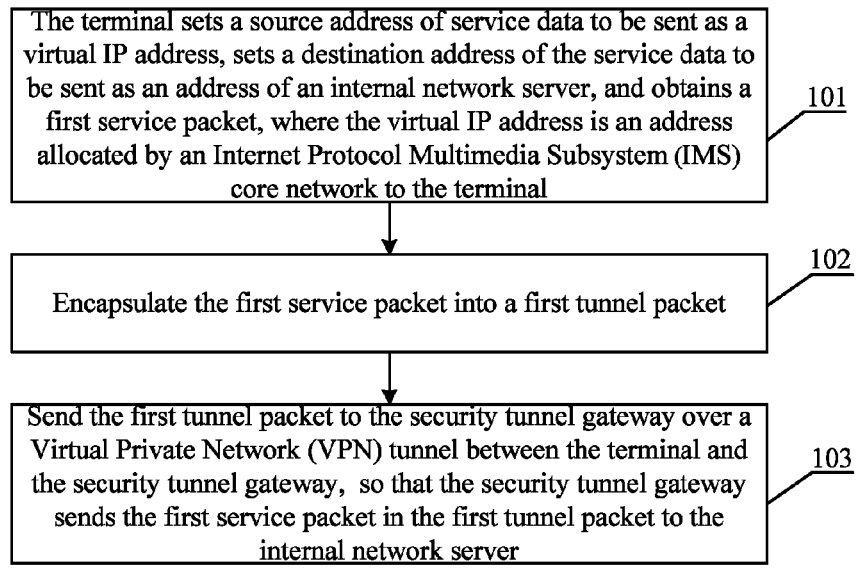
FIG. 1A is a flowchart of a method for a terminal to traverse a private network to communicate with a server in an IMS core network according to an embodiment of the present invention.

Referring to FIG. 1A, an embodiment of the present invention provides a method for a terminal to traverse a private network to communicate with a server in an IMS core network. The method describes the technical solution provided in the embodiment of the present invention from the perspective of a terminal side. The method includes:

101. The terminal sets a source address of service data to be sent as a virtual IP address, sets a destination address of the service data to be sent as an address of an internal network server, and obtains a first service packet, where the virtual IP address is an address allocated by the IMS core network to the terminal.

In this embodiment, the process of obtaining the first service packet by the terminal includes: setting the source address of the service data to be sent as the virtual IP address, setting the destination address of the service data to be sent as the address of the internal network server, setting a source port of the service data to be sent as a service port of the terminal, and setting a destination port of the service data to be sent as a service port of the internal network server.

This embodiment and all subsequent embodiments of the present invention are applicable to the following environment: The terminal is located in a private network such as an enterprise network, and the terminal desires to communicate with the server in the IMS core network; therefore, the terminal needs to traverse the private network to communicate with the internal network server in the IMS core network.

The virtual IP address is allocated by a security tunnel gateway (Security Tunnel Gateway, STG). The security tunnel gateway is located at the edge of the IMS core network. The security tunnel gateway (Security Tunnel Gateway, STG) may be a virtual private network (Virtual Private Network, VPN) gateway described in the subsequent embodiments. A tunnel between the terminal and the security tunnel gateway may be a user datagram protocol (User Datagram Protocol, UDP) VPN tunnel, a security socket layer (Security Socket Layer, SSL) VPN tunnel, or a hypertext transfer Protocol (HyperText Transfer Protocol, HTTP) VPN tunnel.

The virtual IP address may be allocated by a dynamic host configuration Protocol (Dynamic Host Configuration Protocol, DHCP) server of the IMS core network.

The UDP VPN tunnel includes a datagram transport layer security (Datagram Transport Layer Security, DTLS) VPN tunnel.

102. Encapsulate the first service packet into a first tunnel packet, where a source IP address of the first tunnel packet is an IP address of the terminal, and a destination IP address of the first tunnel packet is an IP address of a security tunnel gateway.

The detailed process of encapsulating the first tunnel packet includes: setting the source IP address of the first service packet as the IP address of the terminal, where the IP address is a real IP address of the terminal; setting the destination IP address of the first service packet as the IP address of the security tunnel gateway; setting a source port of the first service packet as a tunnel port of the terminal; and setting a destination port of the first service packet as a tunnel port of the security tunnel gateway.

103. Send the first tunnel packet to the security tunnel gateway over a VPN tunnel between the terminal and the security tunnel gateway, so that the security tunnel gateway sends the first service packet in the first tunnel packet to the internal network server.

Figure 1B:
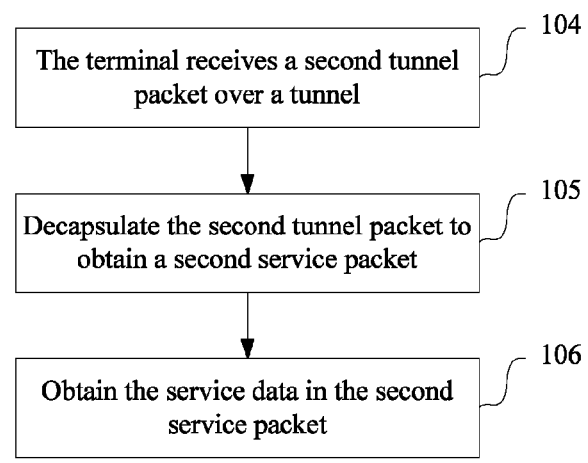
FIG. 1B is another flowchart of a method for a terminal to traverse a private network to communicate with a server in an IMS core network according to an embodiment of the present invention.

FIG. 1B is another flowchart of a method for a terminal to traverse a private network to communicate with a server in an IMS core network according to an embodiment of the present invention. The embodiment illustrated in FIG. 1B describes how the terminal traverses the private network to receive service data sent by the server in the IMS core network when the terminal needs to receive the service data of an internal network server. As shown in FIG. 1B, the method includes:

104. The terminal receives a second tunnel packet over a tunnel, where a source IP address of the second tunnel packet is an IP address of a security tunnel gateway, and a destination IP address of the second tunnel packet is an IP address of the terminal.

105. Decapsulate the second tunnel packet to obtain a second service packet, where a source address of the second service packet is the address of the internal network server, and a destination address of the second service packet is the virtual IP address.

106. Obtain the service data in the second service packet.

In a practical application, the method for the terminal to traverse the private network to communicate with the server in the IMS core network in the embodiment illustrated in FIG. 1A may be used together with the method in the embodiment illustrated in FIG. 1B. The embodiment illustrated in FIG. 1A describes a process of the terminal traversing the private network to send the service data to the server in the IMS core network. The embodiment illustrated in FIG. 1B describes a process of the terminal traversing the private network to receive the service data from the server in the IMS core network.

When a UDP VPN tunnel and an SSL VPN tunnel coexist in the VPN tunnel between the terminal and the security tunnel gateway, the service data is transmitted over the UDP VPN tunnel, and service control information is transmitted over the SSL VPN tunnel. Specifically, the method further includes: sending, by the terminal, first service control information to the security tunnel gateway over the SSL VPN tunnel, for example, sending, by the terminal, information to the security tunnel gateway as a request for allocating a virtual IP address; or when the terminal needs to release a VPN tunnel, sending, by the terminal, indication information of releasing the VPN tunnel to the security tunnel gateway over the SSL VPN tunnel; or receiving, by the terminal, second service control information sent by the security tunnel gateway over the SSL VPN tunnel. For example, over the SSL VPN tunnel, the terminal receives the virtual IP address allocated by the security tunnel gateway after the security tunnel gateway allocates the virtual IP address to the terminal.

In the embodiment of the present invention, the terminal uses the virtual IP address allocated by the IMS core network as an address of communication between the terminal and the internal network server, sets the source address of the service data to be sent as the virtual IP address, sets the destination address of the service data to be sent as the address of the internal network server, and encapsulates the service data into a tunnel packet, and then transmits the tunnel packet to the security tunnel gateway over a tunnel between the terminal and the security tunnel gateway. In this way, the security tunnel gateway is capable of sending the service packet having the virtual IP address as the source address and having the address of the internal network server as the destination address to the internal network server. When the service data of the internal network server needs to be received, the received tunnel packet is decapsulated into a service packet that has the address of the internal network server as the source address and has the virtual IP address as the destination address. In this way, by using the security tunnel gateway, the service data is transmitted between the internal network server and the terminal; and the terminal is capable of traversing the private network to communicate with the server in a public network without modifying an enterprise network that covers the terminal.

Figure 2A:
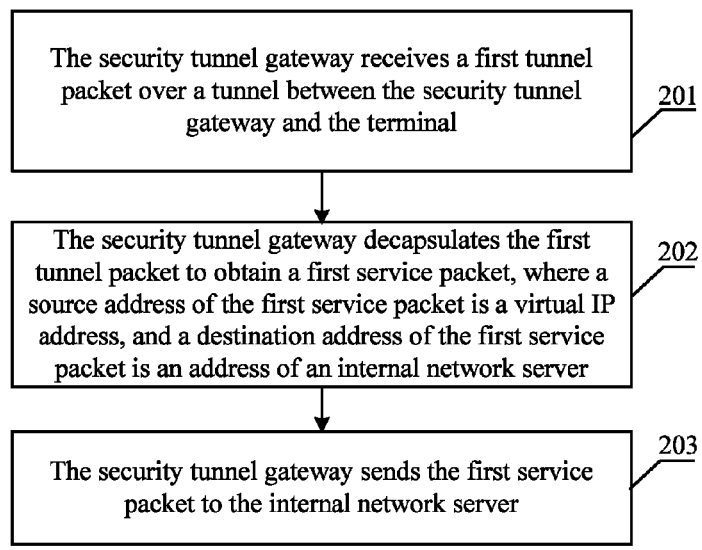
FIG. 2A is another flowchart of a method for a terminal to traverse a private network to communicate with a server in an IMS core network according to an embodiment of the present invention.

Referring to FIG. 2A, an embodiment of the present invention provides a method for a terminal to traverse a private network to communicate with a server in an IMS core network. The method describes the technical solution provided in the embodiment of the present invention from the perspective of a security tunnel gateway side. The method includes:

201. The security tunnel gateway receives a first tunnel packet over a tunnel between the security tunnel gateway and the terminal, where a source IP address of the first tunnel packet is an IP address of the terminal, and a destination IP address of the first tunnel packet is an IP address of the security tunnel gateway.

The virtual IP address is allocated by the security tunnel gateway. The tunnel between the security tunnel gateway and the terminal may be a user datagram Protocol (User Datagram Protocol, UDP) tunnel, a security socket layer (Security Socket Layer, SSL) tunnel, or a hyperText transfer Protocol (HyperText Transfer Protocol, HTTP) tunnel.

202. The security tunnel gateway decapsulates the first tunnel packet to obtain a first service packet, where a source address of the first service packet is a virtual IP address, and a destination address of the first service packet is an address of an internal network server.

203. The security tunnel gateway sends the first service packet to the internal network server.

Figure 2B:
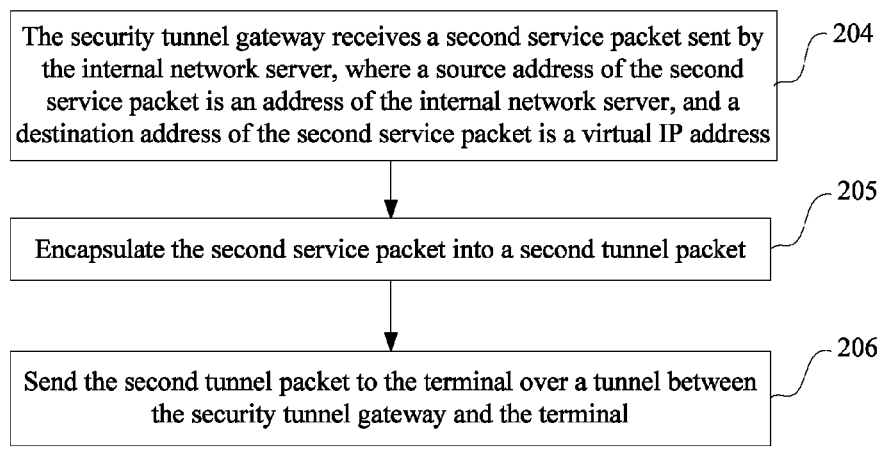
FIG. 2B is another flowchart of a method for a terminal to traverse a private network to communicate with a server in an IMS core network according to an embodiment of the present invention.

FIG. 2B is another flowchart of a method for a terminal to traverse a private network to communicate with a server in an IMS core network according to another embodiment of the present invention. The embodiment illustrated in FIG. 2B describes how to transmit a service packet sent by an internal network server to the terminal over a VPN tunnel from the perspective of a security tunnel gateway side. As shown in FIG. 2B, the method includes:

204. The security tunnel gateway receives a second service packet sent by the internal network server, where a source address of the second service packet is an address of the internal network server, and a destination address of the second service packet is a virtual IP address.

205. Encapsulate the second service packet into a second tunnel packet, where a source IP address of the second tunnel packet is an IP address of the security tunnel gateway, and a destination IP address of the second tunnel packet is an IP address of the terminal.

206. Send the second tunnel packet to the terminal over a tunnel between the security tunnel gateway and the terminal.

The embodiments illustrated in FIG. 2A and FIG. 2B both describe a method for a terminal to traverse a private network to communicate with a server in an IMS core network from the perspective of a security tunnel gateway side. The embodiment illustrated in FIG. 2A describes a process of transmitting the service packet sent by the terminal over a VPN tunnel to the server in the IMS core network from the perspective of a security tunnel gateway side. The embodiment illustrated in FIG. 2B describes a process of transmitting the service packet sent by the server in the IMS core network to the terminal over a VPN tunnel from the perspective of a security tunnel gateway side. In a practical application, the method in the embodiment illustrated in FIG. 2A may be used together with the method in the embodiment illustrated in FIG. 2B.

When a UDP VPN tunnel and an SSL VPN tunnel coexist in the VPN tunnel between the terminal and the security tunnel gateway, the service data is transmitted over a UDP VPN tunnel, and service control information is transmitted over the SSL VPN tunnel. Specifically, the method further includes: sending, by the security tunnel gateway, second service control information to the terminal over the SSL VPN tunnel, for example, after the security tunnel gateway allocates the virtual IP address to the terminal, sending, by the security tunnel gateway, the virtual IP address to the terminal over the SSL VPN tunnel; or receiving, by the security tunnel gateway, first service control information sent by the terminal over the SSL VPN tunnel, for example, when the terminal needs to release a VPN tunnel, sending, by the terminal, indication information of releasing the VPN tunnel to the security tunnel gateway over the SSL VPN tunnel.

In the embodiment of the present invention, the security tunnel gateway serves as an intermediate device, decapsulates the tunnel packet from the terminal and sends it to the internal network server, and encapsulates the service packet from the internal network server into a tunnel packet and sends it to the terminal, so as to facilitate service data transmission between the terminal and the server in the IMS core network. In this way, the terminal is capable of traversing the private network to communicate with the server in a public network without modifying an enterprise network that covers the terminal.

The following gives details about the technical solutions provided in the embodiments of the present invention.

Figure 3:
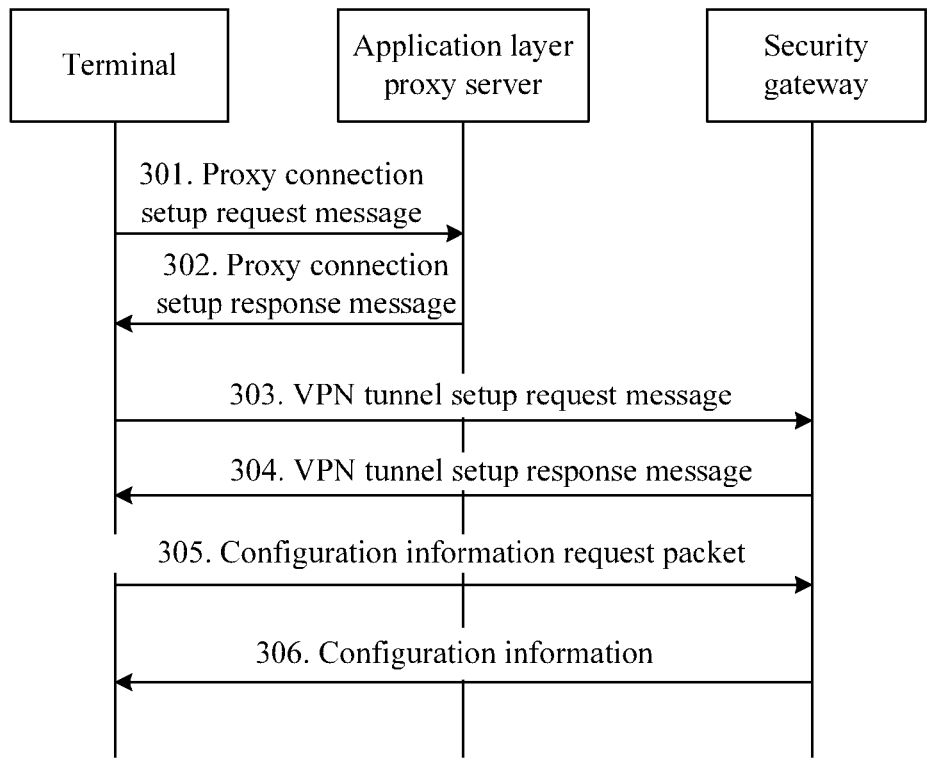
FIG. 3 is a flowchart of VPN tunnel setup according to an embodiment of the present invention.

FIG. 3 is a flowchart of VPN tunnel setup according to an embodiment of the present invention. The process of setting up a VPN tunnel specifically includes:

301. A terminal judges whether relevant information of an application layer proxy server is configured; if yes, the terminal sends a proxy connection setup request message to the application layer proxy server; if no, step 303 is performed.

Specifically, a service module of the terminal invokes an interface of a tunnel transmission module in a communication capability component in the terminal, and triggers the tunnel transmission module to judge whether the relevant information of the application layer proxy server is configured. If the judgment result is yes, a proxy connection setup request message is sent, and if the judgment result is no, a VPN tunnel setup request is directly sent to a VPN security tunnel gateway. The communication capability component in the embodiments of the present invention includes three modules: a tunnel transmission module, an encrypting and decrypting module, and a data converging module. Specifically, this step is performed by the tunnel transmission module.

The relevant information of the application layer proxy server includes a type, an IP address, and a port of the application layer proxy server; and the type of the application layer proxy server includes, for example, an HTTP proxy server, an HTTPS (Hypertext Transfer Protocol Secure) proxy server, and a SOCKS (Socket Secure) proxy server. Before this step, according to the network condition between an enterprise network and a VPN gateway the security tunnel gateway in this embodiment), a user decides whether the terminal needs to connect to the VPN gateway through the application layer proxy server. If the terminal needs to connect to the VPN gateway through the application layer proxy server, it is necessary to configure the type, IP address, and port of the application layer proxy server on the terminal.

302. The application layer proxy server returns a proxy connection setup response message to the terminal.

Specifically, in this step, the application layer proxy server may return the proxy connection setup response message to the tunnel transmission module in the terminal.

The process of setting up a proxy connection between the terminal and one type of application layer proxy servers is different from the process of setting up a proxy connection between the terminal and another type of application layer proxy servers, and the number of required interaction times may vary. However, at the time of setting up a proxy connection, no special requirement is imposed on a NAT device. Therefore, the proxy connection setup request message and the proxy connection setup response message can traverse all normal NAT devices.

303. The terminal sends a VPN tunnel setup request message to the VPN gateway.

Specifically, the tunnel transmission module in the terminal sends the VPN tunnel setup request message to the VPN gateway.

304. The VPN gateway returns a VPN tunnel setup response message to the terminal.

Types of VPN tunnels in this embodiment include: SSL VPN, HTTP VPN, and UDP VPN. Specifically, the VPN gateway returns the VPN tunnel setup response message to the tunnel transmission module in the terminal.

When the terminal needs to connect to the VPN gateway through the application layer proxy server, in step 303, the VPN tunnel setup request message needs to be sent to the VPN gateway through the application layer proxy server. Correspondingly, and in step 304, the VPN gateway sends the VPN tunnel setup response message to the terminal through the application layer proxy server.

305. The terminal sends a configuration information request packet over the VPN tunnel to the VPN gateway after the VPN tunnel is set up successfully.

Specifically, the tunnel transmission module in the terminal sends the configuration information request packet to the VPN gateway.

306. The VPN gateway returns configuration information to the terminal over the VPN tunnel.

The configuration information includes: an IP address/a mask of an internal network server, and a virtual IP address/a mask allocated by the VPN gateway to the terminal. The IP address of the internal network server may be some specific IP addresses, or may be multiple IP address segments. In this case, the internal network server exists within multiple network segments.

Specifically, the VPN gateway returns the configuration information to the tunnel transmission module in the terminal. The tunnel transmission module parses the configuration information, and sends the configuration information to the data converging module. The data converging module configures an address of the terminal as the virtual IP address/mask according to the configuration information, and configures the address/mask of the internal network server that communicates with the terminal, and then notifies the tunnel transmission module that the configurations are complete. The tunnel transmission module sends tunnel setup completion indication information to the service module in the terminal.

Steps 303-304 may be specifically implemented in the following manners:

1. The terminal first attempts to set up a UDP tunnel: The terminal sends a UDP tunnel setup request to the VPN gateway, where the request may carry identity information of the terminal; the VPN gateway may authenticate the terminal identity through information interaction with an authentication server, and return an authentication result to the terminal, if the terminal identity is authorized and a firewall of the enterprise network opens a specific UDP port, it indicates that the UDP tunnel is set up successfully; otherwise, it indicates that the UDP tunnel setup fails. The UDP tunnel described in this paragraph includes a UDP plain text tunnel, a UDP encrypted tunnel, and a UDP-based DTLS (Datagram Transport Layer Security) tunnel. Understandably, when a SOCKS V5 proxy server, an HTTP proxy server, and an HTTPS proxy server coexist, if the UDP tunnel needs to be set up by using the application layer proxy server, the UDP tunnel needs to be set up by using the SOCK5 VS proxy server. Compared with an HTTP tunnel and an SSL tunnel, the UDP tunnel can improve voice quality.

2. The terminal attempts to set up an SSL tunnel: The terminal sends an SSL tunnel setup request to the VPN gateway, where the request message may carry identity information; the VPN gateway may authenticate the identity through information interaction with an authentication server, and return a authentication result to the terminal. If the terminal identity is legal and the firewall of the enterprise network opens a specific SSL port, it indicates that the SSL tunnel is set up successfully; otherwise, it indicates that the SSL tunnel setup fails. After the SSL tunnel is set up successfully, a UDP tunnel may be further set up. Specifically, a UDP connection setup request may be first sent to detect whether a path is enabled between the terminal and the VPN gateway. If the path is enabled, the IMS and the VPN gateway negotiate a UDP tunnel key over the SSL tunnel, so as to set up the UDP tunnel. The UDP tunnel described in this paragraph include a UDP plain text tunnel, a UDP encrypted tunnel, and a UDP-based DTLS (Datagram Transport Layer Security) tunnel. Understandably, if the SSL tunnel needs to be set up by using the application layer proxy server, the SSL tunnel needs to be set up by using an HTTPS proxy server.

3. The terminal attempts to set up an HTTP tunnel: The terminal sends an HTTP tunnel setup request to the VPN gateway, where the request message may carry identity information; the VPN gateway may authenticate the identity through information interaction with an authentication server, and return a authentication result to the terminal. If the terminal identity is legal and the firewall of the enterprise network opens an HTTP port, the HTTP tunnel is set up successfully. After the tunnel is set up successfully, The IMS and the VPN gateway negotiate an SSL tunnel key by using the HTTP tunnel, and the SSL tunnel key is subsequently used to encrypt the service data transmitted in the HTTP tunnel. Understandably, if the HTTP tunnel needs to be set up by using the application layer proxy server, the HTTP tunnel needs to be set up by using an HTTP proxy server.

It should be noted that, if an underway service requires low security but high performance, a UDP tunnel may be set up, and if the underway service requires high security, an SSL tunnel may be set up.

Optionally, the terminal may first attempt to directly set up a service connection with the internal network server in the IMS core network in an existing manner. Because an IMS service requires many UDP ports to be open on a firewall deployed in the enterprise network and the IMS network, and if the development of ports of the firewall does not meet the requirements of the IMS service, the attempt to directly set up the service connection between the terminal and the internal network server fails. After the service connection setup fails, the above manners provided in the embodiments of the present invention may be adopted to request setup of a UDP VPN tunnel, an SSL VPN tunnel, or an HTTP VPN tunnel. The above manners provided in the embodiments of the present invention may also be directly adopted to request setup of the UDP VPN tunnel, the SSL VPN tunnel, or the HTTP VPN tunnel.

Figure 4:
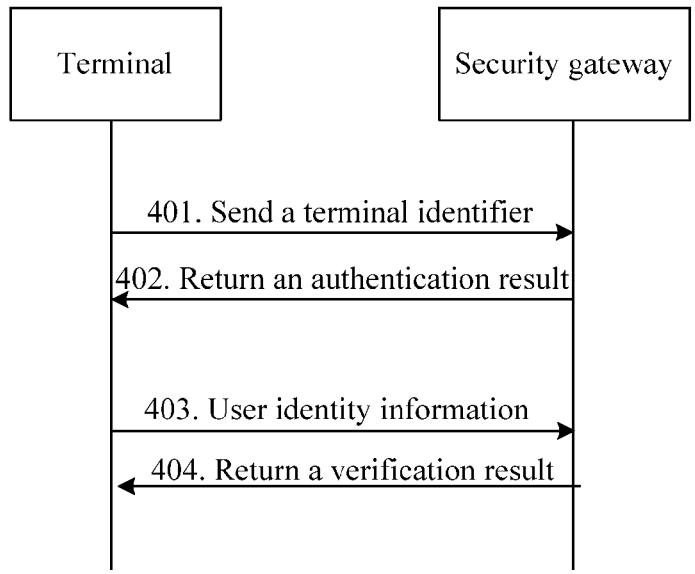
FIG. 4 is a flowchart of terminal identity authentication according to an embodiment of the present invention.

FIG. 4 is a flowchart of terminal identity authentication over a VPN tunnel according to an embodiment of the present invention. In the embodiment of the invention, the process of identity authentication over the VPN tunnel includes:

401. A terminal sends a terminal identifier to a VPN gateway over a VPN tunnel.

402. The VPN gateway determines, according to local or external subscription records and the terminal identifier, whether to allow the terminal to set up a VPN tunnel, and returns an authentication result to the terminal, wherein the result is indicating whether the terminal is allowed to set up a VPN tunnel.

403. If the terminal is allowed to set up a VPN tunnel, the terminal sends user identity information to the VPN gateway over the VPN tunnel.

The user identity information includes a username and a password.

404. The VPN gateway authenticates the user identity according to the user identity information, and returns a authentication result.

Specifically, the user identity may be authenticated according to locally stored subscriber information or subscriber information in an external server.

In the embodiment of the invention, the terminal also sends a message over the VPN tunnel to request the VPN gateway to authenticate a component invoker. In this embodiment, the terminal sends a message over the VPN tunnel to request the VPN gateway to determine whether the terminal is allowed to use a communication capability component and implement the function of the communication capability component. In another words the terminal sends a message over the VPN tunnel to request the VPN gateway to determine whether the terminal is allowed to set up a VPN tunnel and perform data convergence.

In the embodiment of the invention, the entity for executing the steps shown in FIG. 4 is a tunnel transmission module in the terminal.

Figure 5:
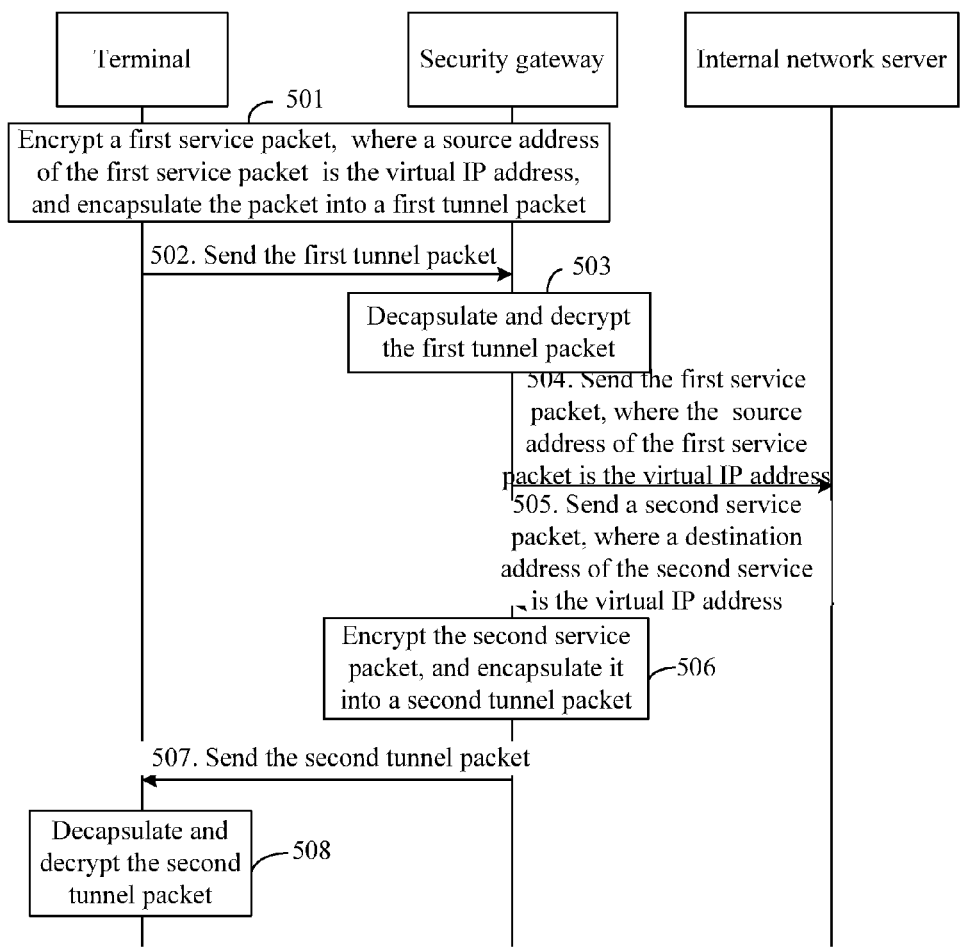
FIG. 5 is a flowchart of secure traversal of IMS service data according to an embodiment of the present invention.

FIG. 5 is a flowchart of secure traversal of IMS service data according to an embodiment of the present invention. In this method, a terminal communicates with an internal network server in an IMS core network proactively. Specifically, the secure traversal process of the IMS service data includes:

501-502. The terminal sets a source address of service data to be sent as a virtual IP address, sets a destination address of the service data to be sent as an address of the internal network server, sets a source port of the service data to be sent as a service port of the terminal, sets a destination port of the service data to be sent as a service port of the internal network server, obtains a first service packet, and encrypts the first service packet, sets a source IP address of the encrypted packet as a real IP address of the terminal, sets a destination IP address of the encrypted packet as an IP address of a VPN gateway, sets a source port of the encrypted packet as a tunnel port of the terminal, sets a destination port of the encrypted packet as a tunnel port of the VPN gateway, and obtains a first tunnel packet, and then sends the first tunnel packet to the VPN gateway over a tunnel between the terminal and the VPN gateway.

As described above, the terminal includes a communication capability component, and the communication capability component includes three modules: a data converging module, an encrypting and decrypting module, and a tunnel transmission module. Specifically, the data converging module includes a first data converging module and a second data converging module; the encrypting and decrypting module includes an encrypting module and a decrypting module; and the tunnel transmission module includes a first tunnel transmission module and a second tunnel transmission module.

The terminal may obtain the first service packet in two manners. The first manner is: A service module of the terminal invokes an interface provided by the first data converging module in the terminal, and triggers the first data converging module to set the source address of the service data to be sent as the virtual IP address, set the destination address of the service data to be sent as the address of the internal network server, set the source port of the service data to be sent as the service port of the terminal, and set the destination port of the service data to be sent as the service port of the internal network server. The second manner is: The first data converging module in the terminal captures the service data to be sent on a communication interface provided by an operating system, sets the source address of the service data to be sent as the virtual IP address, sets the destination address of the service data to be sent as the address of the internal network server, sets the source port of the service data to be sent as the service port of the terminal, and sets the destination port of the service data to be sent as the service port of the internal network server. The communication interface provided by the operating system may be a virtual network adapter driver interface or a transport driver interface (Transport Driver Interface, TDI).

Afterward, the encrypting module in the terminal encrypts the first service packet; the first tunnel transmission module in the terminal sets the source IP address of the encrypted packet as the real IP address of the terminal, sets the destination IP address of the encrypted packet as the IP address of the VPN gateway, sets the source port of the encrypted packet as the tunnel port of the terminal, sets the destination port of the encrypted packet as the tunnel port of the VPN gateway, and obtains the first tunnel packet, and then sends the first tunnel packet to the VPN gateway over the tunnel between the terminal and the VPN gateway. Specifically, if the adopted VPN tunnel is an HTTP VPN tunnel, the encrypting module in the terminal in this step uses an SSL tunnel key to encrypt the first service packet.

503-504. After receiving the first tunnel packet, the VPN gateway decapsulates and decrypts the first tunnel packet to obtain the first service packet having the virtual IP address as the source address and having the IP address of the internal network server as the destination address, and sends the first service packet to the internal network server.

If an HTTP tunnel is adopted, the VPN gateway in this step uses the SSL tunnel key to decrypt the first tunnel packet.

505. After the internal network server receives the first service packet, if a response packet needs to be returned to the terminal, the internal network server sends a second service packet to the VPN gateway, where a source address of the second service packet is the IP address of the internal network server, a destination address of the second service packet is the virtual IP address, a source port of the second service packet is the service port of the internal network server, and a destination port of the second service packet is the service port of the terminal.

Specifically, the internal network server broadcasts an address resolution protocol (Address resolution protocol, ARP) message that carries the virtual IP address to query a VPN gateway to which the virtual IP address belongs. The VPN gateway that has once allocated this virtual IP address sends an ARP response message to the internal network server, where the ARP response message carries a MAC (media access control, MAC) address of the VPN gateway. The internal network server sends the second service packet to the VPN gateway according to the MAC address.

506-507. The VPN gateway encrypts the received second service packet, encapsulates it into a second tunnel packet, and sends the second tunnel packet to the terminal over the tunnel between the VPN gateway and the terminal.

If an HTTP tunnel is adopted, the VPN gateway in this step uses an SSL tunnel key to encrypt the second service packet.

508. After receiving the second tunnel packet sent by the VPN gateway, the terminal decapsulates and decrypts the received second tunnel packet to obtain the second service packet, and extracts the service data from the second service packet.

Specifically, the second tunnel transmission module in the terminal receives the second tunnel packet sent by the VPN gateway, decapsulates the second tunnel packet, and removes the source IP address (IP address of the VPN gateway), the destination IP address (real IP address of the terminal), the source port (tunnel port of the VPN gateway), and the destination port (tunnel port of the terminal) in the second tunnel packet. Afterward, the decrypting module in the terminal decrypts the decapsulated packet to obtain the second service packet. The second data converging module removes the source IP address (IP address of the internal network server), the destination IP address (virtual IP address), the source port (service port of the internal network server), and the destination port (service port of the terminal) in the decrypted second service packet, and extracts the service data from the second service packet.

The service module located on an upper layer of the terminal may obtain the service data in the second service packet in two manners. The first manner is: The service module of the terminal obtains the service data in the second service packet from the second data converging module in the terminal. The second manner is: The second data converging module of the terminal inserts the extracted the service data into the communication interface provided by the operating system, and the service module in the terminal obtains the service data in the second service packet from the communication interface provided by the operating system.

The service data in the embodiment of the present invention is transmitted over a VPN tunnel (for example, the above described UDP VPN tunnel, SSL VPN tunnel, and HTTP VPN tunnel). Such tunnels can traverse NAT devices such as routers, firewalls, and switches that have the NAT function. Therefore, operations, such as access control and address modification, performed by the NAT devices on the service data may be prevented, and failure of communication between the terminal and the internal network server due to the operations performed by the NAT devices may be avoided. Moreover, the UDP VPN tunnel can traverse a SOCKS V5 proxy server, the SSL VPN tunnel can traverse an HTTPS proxy server, and the HTTP VPN tunnel can traverse an HTTP proxy server. Therefore, when the terminal communicates with the internal network server, operations, such as access control and address modification, performed by a corresponding application layer proxy server on the service data may be prevented, and failure of communication between the terminal and the internal network server due to the operations performed by the application layer proxy server may be avoided. Moreover, in this embodiment, the virtual IP address is used as an address of communication between the terminal and the internal network server, and the terminal communicates with the internal network server over the VPN gateway, without requiring an enterprise network to perform an additional route conversation or modifying the enterprise network.

Figure 6:
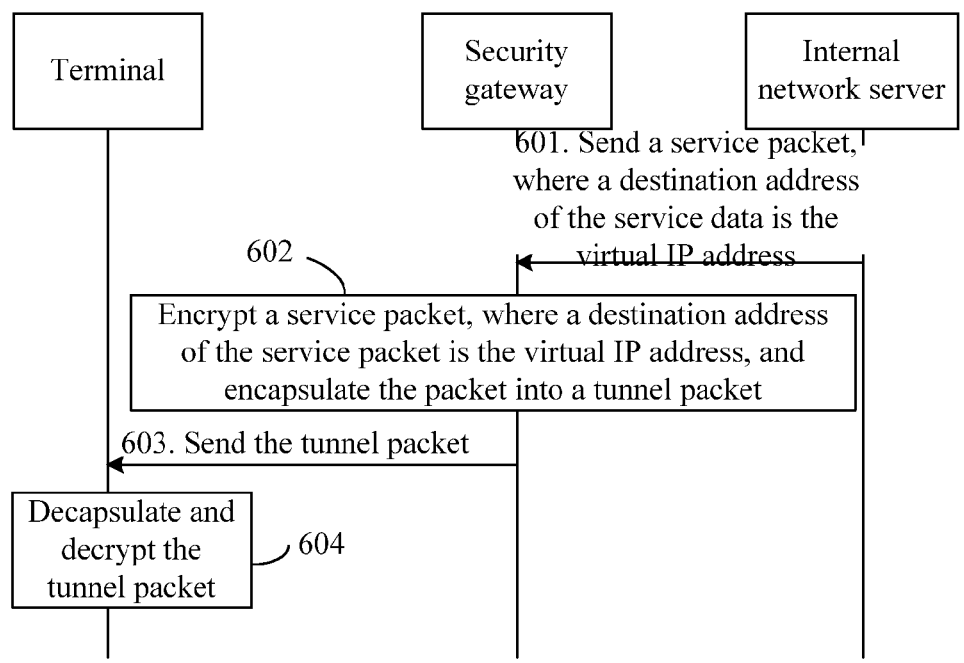
FIG. 6 is another flowchart of secure traversal of IMS service data according to an embodiment of the present invention.

FIG. 6 is a flowchart of secure traversal of IMS service data according to an embodiment of the present invention. In this method, an internal network server in an IMS core network communicates with a terminal proactively. Specifically, the secure traversal process of the IMS service data includes:

601. The internal network server sends a service packet to a VPN gateway, where the source address of the service packet is the IP address of the internal network server, the destination address of the service packet is the virtual IP address, the source port of the service packet is the service port of the internal network server, and the destination port of the service packet is the service port of the terminal.

Specifically, when the internal network server needs to send service data to the terminal corresponding to a specific virtual IP address, the internal network server broadcasts an ARP message that carries the virtual IP address to query a VPN gateway to which the virtual IP address belongs. The VPN gateway that has once allocated this virtual IP address sends an ARP response message to the internal network server, where the ARP response message carries an IP address of the VPN gateway. According to the IP address, the internal network server sends the service packet to the VPN gateway, where the source address of the service packet is the IP address of the internal network server, and the destination address of the service packet is the virtual IP address.

602-603. The VPN gateway encrypts the received service packet, encapsulates it into a tunnel packet, and sends the tunnel packet to the terminal over a tunnel that has been set up.

For the specific implementation manner of this step, reference may be made to the description in steps 506-507, which is not repeated herein any further.

604. After receiving the tunnel packet sent by the VPN gateway, the terminal decapsulates and decrypts the received tunnel packet to obtain the service packet, and extracts the service data from the service packet.

For the specific implementation manner of this step, reference may be made to the description in step 508, which is not repeated herein any further.

The service data in the embodiment of the present invention is transmitted over a VPN tunnel (for example, the above described UDP VPN tunnel, SSL VPN tunnel, and HTTP VPN tunnel). Such tunnels can traverse NAT devices such as routers, firewalls, and switches that have the NAT function. Therefore, operations, such as access control and address modification, performed by the NAT devices on the service data may be prevented, and failure of communication between the terminal and the internal network server due to the operations performed by the NAT devices may be avoided. Moreover, the UDP VPN tunnel can traverse a SOCKS V5 proxy server, the SSL VPN tunnel can traverse an HTTPS proxy server, and the HTTP VPN tunnel can traverse an HTTP proxy server. Therefore, when the terminal communicates with the internal network server, operations, such as access control and address modification, performed by a corresponding application layer proxy server on the service data may be prevented, and failure of communication between the terminal and the internal network server due to the operations performed by the application layer proxy server may be avoided. Moreover, in this embodiment, the virtual IP address is used as an address of communication between the terminal and the internal network server, and the terminal communicates with the internal network server over the VPN gateway, without requiring an enterprise network to perform an additional route conversation or modifying the enterprise network.

It should be noted that, in the above embodiment, after the UDP VPN tunnel, the SSL VPN tunnel, or the HTTP VPN tunnel is set up, the terminal sends a keep-alive packet to the VPN gateway periodically, or sends the keep-alive packet to the VPN gateway at a set time, so as to maintain the tunnel that has been set up.

It should be noted that, if two VPN tunnels, such as a UDP VPN tunnel and an SSL VPN tunnel, exist between the terminal and the VPN gateway, the service data may be transmitted over the UDP VPN tunnel. The specific transmission manner is described in the above embodiment. The terminal may further use the SSL VPN tunnel to transmit service control information. Specifically, after encrypting first service control information to be sent, the terminal sets a source IP address of the encrypted control information as a real IP address of the terminal, sets a destination IP address of the encrypted control information as the IP address of the VPN gateway, and then sends the encrypted control information to the VPN gateway; and after receiving the encrypted control information, the VPN gateway decapsulates and decrypts the encrypted control information to obtain the first control information. Similarly, the VPN gateway may send second control information to the terminal over the SSL VPN tunnel. In this way, the service data is transmitted over the UDP VPN tunnel with lower security, and the service control information is transmitted over the SSL VPN tunnel with higher security.

Figure 7:
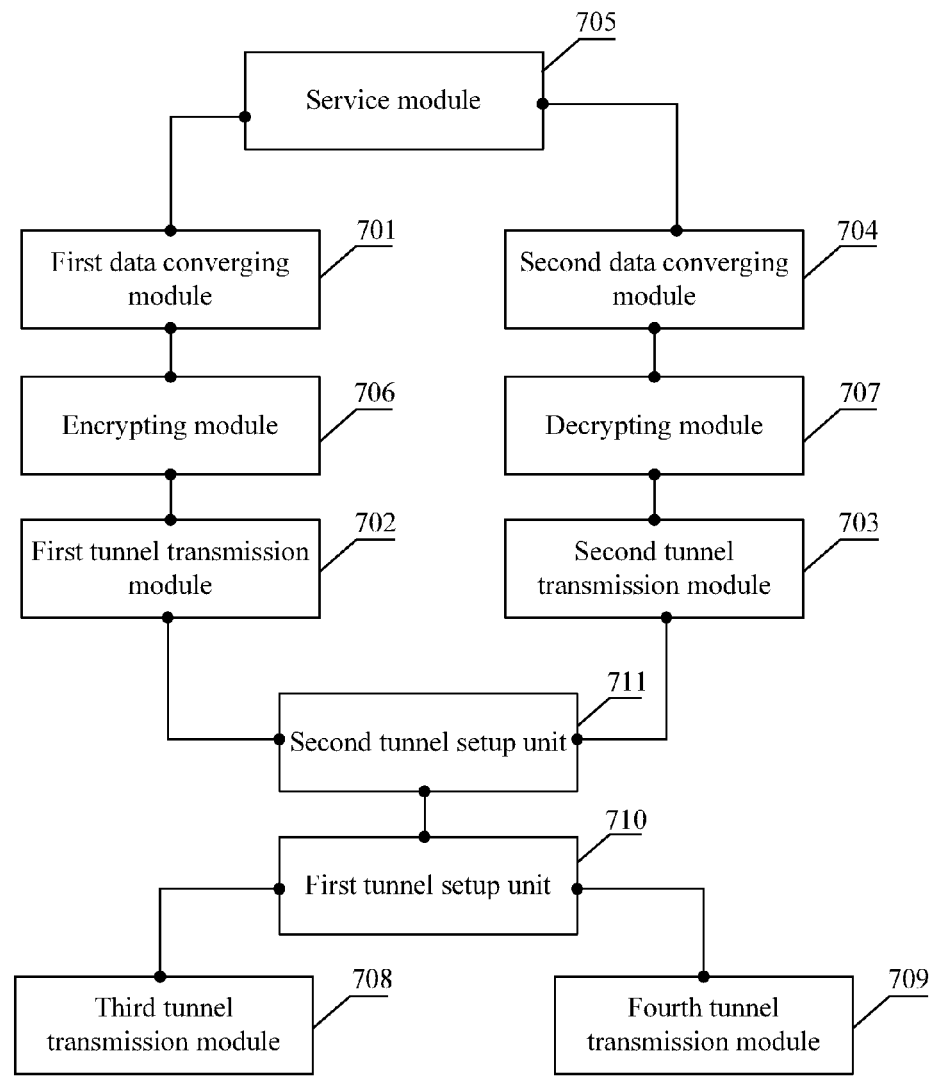
FIG. 7 is a structural diagram of a terminal according to an embodiment of the present invention.

Referring to FIG. 7, an embodiment of the present invention provides a terminal, which includes:

a first data converging module 701, configured to set a source address of service data to be sent as a virtual IP address, set a destination address of the service data to be sent as an address of an internal network server, and obtain a first service packet, where the virtual IP address is an address allocated by an IP multimedia subsystem, IMS, core network to the terminal; and a first tunnel transmission module 702, configured to encapsulate the first service packet into a first tunnel packet, where a source IP address of the first tunnel packet is an IP address of the terminal, and a destination IP address of the first tunnel packet is an IP address of a security tunnel gateway; and send the first tunnel packet to the security tunnel gateway over a virtual private network VPN tunnel between the terminal and the security tunnel gateway, so that the security tunnel gateway sends the first service packet in the first tunnel packet to the internal network server.

In addition, in another embodiment of the present invention, to receive the service data sent by the internal network server, the terminal may further include:

a second tunnel transmission module 703, configured to: when the terminal needs to receive the service data of the internal network server, receive a second tunnel packet over the tunnel, and decapsulate the second tunnel packet, where a source IP address of the second tunnel packet is the IP address of the security tunnel gateway, and a destination IP address of the second tunnel packet is the IP address of the terminal; and a second data converging module 704, configured to extract service data from a second service packet obtained as a result of decapsulation by the second tunnel transmission module, where a source address of the second service packet is the address of the internal network server, and a destination address of the second service packet is the virtual IP address.

Furthermore, in another embodiment of the present invention, the terminal may further include:

a service module 705, specifically configured to: when the terminal needs to send the service data, by invoking an interface provided by the first data converging module, trigger the first data converging module to set the source address of the service data to be sent as the virtual IP address, and set the destination address of the service data to be sent as the address of the internal network server; and when the terminal needs to receive the service data of the internal network server, obtain the service data in the second service packet from the second data converging module.

Specifically, the first data converging module 701 is configured to: when the terminal needs to send the service data, capture the service data to be sent on a communication interface provided by an operating system, set the source address of the service data to be sent as the virtual IP address, and set the destination address of the service data to be sent as the address of the internal network server, where the service data to be sent is sent by the service module 705 to the communication interface provided by the operating system. In this way, the service module is not necessarily coupled with a communication capability component closely.

The second data converging module 704 is configured to: when the terminal needs to receive the service data of the internal network server, extract the service data from the second service packet, and insert the extracted service data into the communication interface provided by the operating system, so that the service module in the terminal obtains the service data in the second service packet from the communication interface provided by the operating system.

In another embodiment of the present invention, to ensure security of the packet transmitted over the VPN tunnel, the terminal may further include:

an encrypting module 706, configured to use an SSL tunnel key to encrypt the first service packet when the VPN tunnel between the terminal and the security tunnel gateway is an HTTP VPN tunnel; and a decrypting module 707, configured to use the SSL tunnel key to decrypt the packet obtained as a result of decapsulation by the second tunnel transmission module when the VPN tunnel between the terminal and the security tunnel gateway is the HTTP VPN tunnel.

The SSL tunnel key is pre-negotiated between the terminal and the security tunnel gateway over the HTTP tunnel. In this case, the first tunnel transmission module 701 is specifically configured to encapsulate the first service packet, which is encrypted by the encrypting module 706, into the first tunnel packet, and send the first tunnel packet to the security tunnel gateway over the VPN tunnel between the terminal and the security tunnel gateway. The second data converging module 704 is specifically configured to extract the service data from the packet decrypted by the decrypting module 707.

When two VPN tunnels such as UDP VPN tunnel and SSL VPN tunnel exist between the terminal and the security tunnel gateway, in another embodiment of the present invention, the terminal may use the first data converging module 701, the first tunnel transmission module 702, the second tunnel transmission module 703, and the second data converging module 704 to process and transmit the service data; and may use a third tunnel transmission module 708 and/or a fourth tunnel transmission module 709 to process and transmit service control information.

The third tunnel transmission module 708 is configured to send first service control information to the service security tunnel gateway over the SSL VPN tunnel; and/or the fourth tunnel transmission module 709 is configured to receive second service control information sent by the service security tunnel gateway over the SSL VPN tunnel.

To set up the two VPN tunnels mentioned above, in another embodiment of the present invention, the following units are further included:

a first tunnel setup unit 710, configured to set up a UDP VPN tunnel; and a second tunnel setup unit 711, configured to negotiate a UDP tunnel key with the security tunnel gateway over the SSL tunnel that has been set up, so as to set up a UDP tunnel.

In the embodiment of the present invention, the terminal uses the virtual IP address allocated by the IMS core network as an address of communication between the terminal and the internal network server, sets the source address of the service data to be sent as the virtual IP address, sets the destination address of the service data to be sent as an address of the internal network server, and encapsulates the service data into a tunnel packet, and then transmits the tunnel packet to the security tunnel gateway over a tunnel between the terminal and the security tunnel gateway. Thus, the security tunnel gateway is capable of sending the service packet having the virtual IP address as the source address and having the address of the internal network server as the destination address to the internal network server. When the terminal receives the service data of the internal network server, the received tunnel packet is decapsulated into a service packet that has the address of the internal network server as the source address and has the virtual IP address as the destination address. In this way, the service data is transmitted between the internal network server and the terminal through the security tunnel gateway; and the terminal is capable of traversing a private network to communicate with the server in a public network without modifying an enterprise network that covers the terminal.

Figure 8:
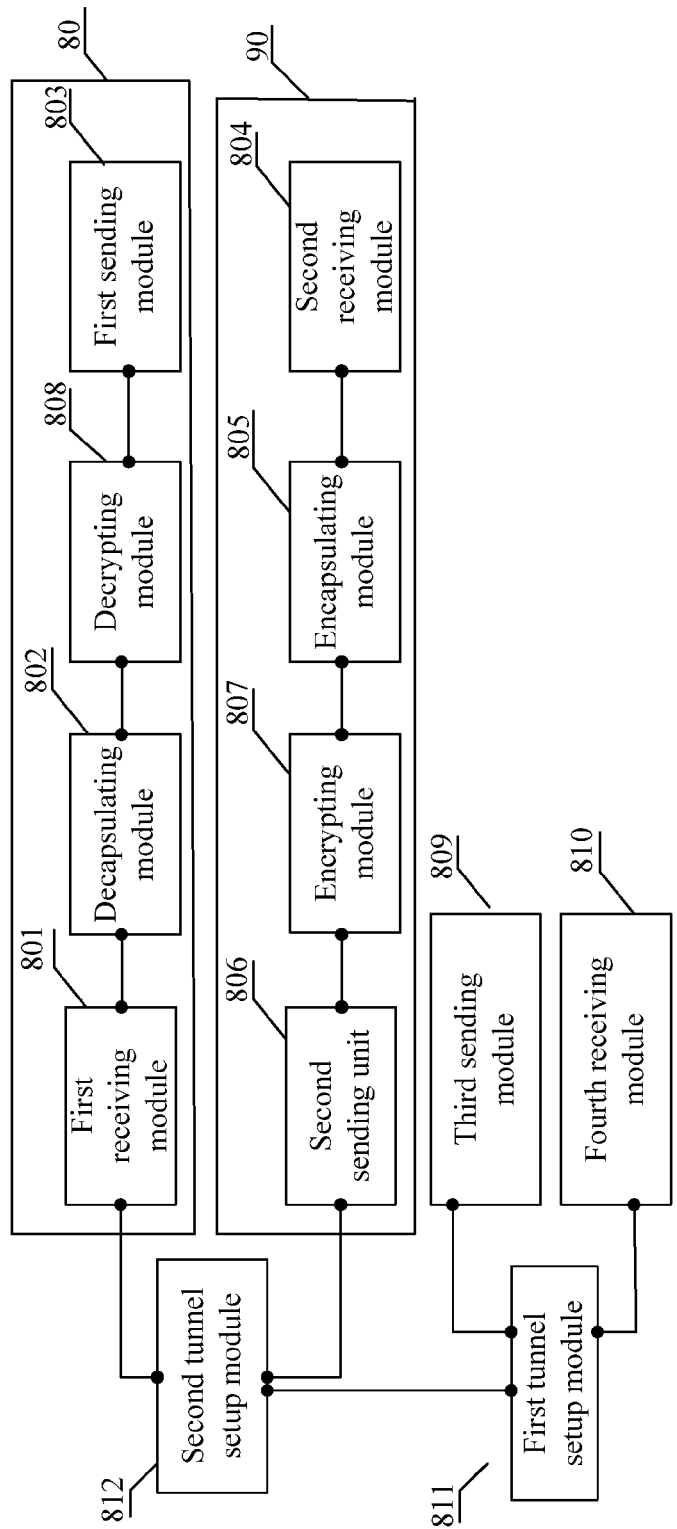
FIG. 8 is a structural diagram of a security tunnel gateway according to an embodiment of the present invention.

Referring to FIG. 8, an embodiment of the present invention provides a security tunnel gateway, which includes a first tunnel transmission module 80. The first tunnel transmission module 80 includes a first receiving module 801, a decapsulating module 802, and a first sending module 803.

The first receiving module 801 is configured to receive a first tunnel packet over a tunnel between the security tunnel gateway and a terminal, where a source IP address of the first tunnel packet is an IP address of the terminal, and a destination IP address of the first tunnel packet is an IP address of the security tunnel gateway;

The decapsulating module 802 is configured to decapsulate the first tunnel packet; and The first sending module 803 is configured to send a first service packet obtained as a result of decapsulation by the decapsulating module to an internal network server, where a source address of the first service packet is a virtual IP address, and a destination address of the first service packet is an address of the internal network server.

Furthermore, in another embodiment of the present invention, to transmit to the terminal the service packet sent by the internal network server, a first tunnel transmission module 90 may be further included. The first tunnel transmission module 90 specifically includes:

a second receiving module 804, configured to receive a second service packet sent by the internal network server, where a source address of the second service packet is the address of the internal network server, and a destination address of the second service packet is the virtual IP address;

an encapsulating module 805, configured to encapsulate the second service packet into a second tunnel packet, where a source IP address of the second tunnel packet is the IP address of the security tunnel gateway, and a destination IP address of the second tunnel packet is the IP address of the terminal; and a second sending unit 806, configured to send the second tunnel packet to the terminal over the tunnel between the security tunnel gateway and the terminal.

In another embodiment of the present invention, to ensure security of the packet transmitted on a VPN tunnel, the security tunnel gateway may further include:

an encrypting module 807, configured to use an SSL tunnel key to encrypt the second service packet when the VPN tunnel between the terminal and the security tunnel gateway is an HTTP VPN tunnel; and a decrypting module 808, configured to use the SSL tunnel key to decrypt the packet obtained as a result of decapsulation by the decapsulating module to obtain the first service packet when the VPN tunnel between the terminal and the security tunnel gateway is the HTTP VPN tunnel.

The SSL tunnel key is pre-negotiated between the terminal and the security tunnel gateway over the HTTP tunnel; the encapsulating module 805 is specifically configured to encapsulate the encrypted second service packet into the second tunnel packet; and the first sending module 803 is specifically configured to send the first service packet decrypted by the decrypting module 808 to the internal network server.

When two VPN tunnels such as a UDP VPN tunnel and an SSL VPN tunnel coexist between the terminal and the security tunnel gateway, the terminal may transmit a service packet over the UDP VPN tunnel, and transmit service control information over the SSL VPN tunnel. Therefore, in still another embodiment of the present invention, the following modules are further included:

a third sending module 809, configured to send second service control information to the terminal over the SSL VPN tunnel; and a fourth receiving module 810, configured to receive first service control information sent by the terminal over the SSL VPN tunnel.

To set up the two tunnels mentioned above, in still another embodiment of the present invention, the following modules are further included:

a first tunnel setup module 811, configured to set up an SSL tunnel with the terminal; and a second tunnel setup module 812, configured to negotiate a UDP tunnel key with the terminal over the SSL tunnel that has been set up, so as to set up a UDP tunnel.

In the embodiment of the present invention, the security tunnel gateway serves as an intermediate device, decapsulates the tunnel packet from the terminal and sends it to the internal network server, and encapsulates the service packet from the internal network server into a tunnel packet and sends it to the terminal, so as to facilitate service data transmission between the terminal and the server in the IMS core network. In this way, the terminal is capable of traversing a private network to communicate with the server in a public network without modifying an enterprise network that covers the terminal.

Figure 9:
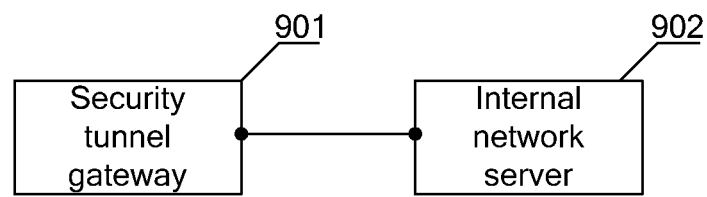
FIG. 9 is a structural diagram of a network system according to an embodiment of the present invention.

Referring to FIG. 9, an embodiment of the present invention provides a network system. The network system mainly includes a security tunnel gateway 901 and an internal network server 902 described in the above embodiments. The functions and the structure of the security tunnel gateway are similar to what is described in the above embodiments, which are not repeated herein any further.

The network system provided in the embodiment of the present invention uses the security tunnel gateway as an intermediate device, decapsulates a tunnel packet from a terminal and sends it to the internal network server, and encapsulates a service packet from the internal network server into a tunnel packet and sends it to the terminal, so as to facilitate service data transmission between the terminal and the server in an IMS core network. In this way, the terminal is capable of traversing a private network to communicate with the server in a public network without modifying an enterprise network that covers the terminal.

It should be noted that, for brevity, the above method embodiments are represented as a series of actions. But persons skilled in the art should appreciate that the present invention is not limited to the order of the described actions, because according to the present invention, some steps may adopt other order or occur simultaneously. It should be further understood by persons skilled in the art that the described embodiments all belong to exemplary embodiments, and the involved actions and modules are not necessarily required by the present invention.

In the above embodiments, the description of each embodiment has its emphasis, and some embodiments may not be detailed. Reference may be made to the relevant description of other embodiments.

Persons of ordinary skill in the art should understand that all or a part of the processes of the methods in the above embodiments may be implemented by a program instructing relevant hardware. The program may be stored in a computer readable storage medium. When the program is run, the processes of the methods in the embodiments are performed. The storage medium may be a magnetic disk, an optical disk, a Read-Only Memory (Read-Only Memory, ROM), a Random Access Memory (Read-Only Memory, RAM), and the like.

Detailed above are a method, an apparatus, and a network system for a terminal to traverse a private network to communicate with a server in an IMS core network provided by the present invention. It is apparent that persons of ordinary skill in the art can make modifications to the specific implementation manners and application scopes according the idea of the embodiments of the present invention. In conclusion, the content in the specification should not be construed as a limitation to the present invention.

What is claimed is:

1. A method performed by a terminal in a private network to communicate with a network server in an internet protocol multimedia subsystem (IMS) network, comprising:
  constructing a first service packet, including:
    setting a source address of the first service packet as a virtual IP address allocated by the IMS network to the terminal, and
    setting a destination address of the first service packet as an address of the network server in the IMS network, wherein the first service packet contains service data to be sent to the network server;
  encapsulating the first service packet into a first tunnel packet, wherein a source IP address of the first tunnel packet is a real IP address of the terminal, and a destination IP address of the first tunnel packet is an IP address of a security tunnel gateway located at an edge of the IMS network; and
  sending the first tunnel packet to the security tunnel gateway of the IMS network over a virtual private network (VPN) tunnel between the terminal and the security tunnel gateway, for the security tunnel gateway to deliver the first service packet to the network server;
  wherein the VPN tunnel between the terminal and the security tunnel gateway is a User Datagram Protocol (UDP) tunnel; and
  when a Security Socket Layer (SSL) tunnel exists between the terminal and the security tunnel gateway additionally, the method further comprises:
  sending first service control information to the security tunnel gateway over the SSL tunnel, the first service control information comprises a request for allocating the virtual IP address; and
  receiving second service control information sent by the security tunnel gateway over the SSL tunnel, the second service control information comprises the virtual IP address allocated by the security tunnel gateway to the terminal.

2. The method according to claim 1, wherein
  the VPN tunnel between the terminal and the security tunnel gateway is a Hypertext Transfer Protocol (HTTP) tunnel;
  before encapsulating the first service packet into the first tunnel packet, the method further comprises:
  encrypting the first service packet with a SSL tunnel key, wherein the SSL tunnel key is pre-negotiated between the terminal and the security tunnel gateway over the HTTP tunnel; and
  the step of encapsulating the first service packet into the first tunnel packet comprises:
  encapsulating the encrypted first service packet into the first tunnel packet.

3. The method according to claim 1, further comprising:
  receiving a second tunnel packet over the tunnel when the terminal needs to receive service data of the network server, wherein a source IP address of the second tunnel packet is the IP address of the security tunnel gateway, and a destination IP address of the second tunnel packet is the real IP address of the terminal;
  decapsulating the second tunnel packet to obtain a second service packet, wherein a source address of the second service packet is the address of the network server, and a destination address of the second service packet is the virtual IP address; and
  obtaining the service data in the second service packet.

4. The method according to claim 3, wherein
  the VPN tunnel between the terminal and the security tunnel gateway is an HTTP tunnel;
  after decapsulating the second tunnel packet, the method further comprises:
  using an SSL tunnel key to decrypt the packet obtained as a result of decapsulation, wherein the SSL tunnel key is pre-negotiated between the terminal and the security tunnel gateway over the HTTP tunnel; and
  the second service packet is a packet obtained as a result of decryption.

5. The method according to claim 1, wherein
  the method further comprises: setting up the SSL tunnel with the security tunnel gateway firstly, and negotiating a UDP tunnel key with the security tunnel gateway over the SSL tunnel that has been set up, so as to set up the UDP tunnel.

6. The method according to claim 1, wherein
  the first service control information further comprises indication information of releasing the VPN tunnel.

7. The method according to claim 1, before the sending the first tunnel packet to the security tunnel gateway, the method comprises:
  judging whether relevant information of an application layer proxy server is configured, wherein the relevant information of the application layer proxy server comprises a type of the application layer proxy server, an IP address of the application layer proxy server, and a port of the application layer proxy server;
  based on the determination of relevant information of an application layer proxy server is configured, sending a proxy connection setup request message to the application layer proxy server;
  receiving a proxy connection setup response message returned from the application layer proxy server;
  sending a VPN tunnel setup request message to the security tunnel gateway through the application layer proxy server;
  receiving a VPN tunnel setup response message returned from the security tunnel gateway through the application layer proxy server.

8. The method according to claim 7, the method comprises:
  based on the determination of relevant information of an application layer proxy server is not configured, sending a VPN tunnel setup request message to the security tunnel gateway;
  receiving a VPN tunnel setup response message returned from the security tunnel gateway.

9. A method performed by a security tunnel gateway for a terminal in a private network to communicate with a network server in an Internet Protocol Multimedia Subsystem (IMS) network, comprising:
  receiving a first tunnel packet over a virtual private network (VPN) tunnel between the security tunnel gateway and the terminal, wherein the security tunnel gateway is located at an edge of the IMS network, a source IP address of the first tunnel packet is a real IP address of the terminal, and a destination IP address of the first tunnel packet is an IP address of the security tunnel gateway;

decapsulating the first tunnel packet to obtain a first service packet, wherein a source address of the first service packet is a virtual IP address, and a destination address of the first service packet is an address of the network server, wherein the virtual IP address is an address allocated by the IMS network to the terminal; and forwarding the first service packet to the network server;

wherein the VPN tunnel between the terminal and the security tunnel gateway is a User Datagram Protocol (UDP) tunnel; and when an Security Socket Layer (SSL) tunnel exists between the terminal and the security tunnel gateway additionally, the method further comprises:

receiving first service control information sent by the terminal over the SSL tunnel, the first service control information comprises a request for allocating the virtual IP address;

and sending second service control information to the terminal over the SSL tunnel, the second service control information comprises the virtual IP address allocated by the security tunnel gateway to the terminal.

10. The method according to claim 9, wherein the VPN tunnel between the terminal and the security tunnel gateway is a Hypertext Transfer Protocol (HTTP) tunnel;

after decapsulating the first tunnel packet, the method further comprises:

using a SSL tunnel key to decrypt the packet obtained as a result of decapsulation, wherein the SSL tunnel key is pre-negotiated between the terminal and the security tunnel gateway over the HTTP tunnel; and the first service packet is a packet obtained as a result of decryption.

11. The method according to claim 9, further comprising:

receiving a second service packet sent by the network server, wherein a source address of the second service packet is the address of the network server, and a destination address of the second service packet is the virtual IP address;

encapsulating the second service packet into a second tunnel packet, wherein a source IP address of the second tunnel packet is an IP address of the security tunnel gateway, and a destination IP address of the second tunnel packet is the real IP address of the terminal; and sending the second tunnel packet to the terminal over the tunnel between the security tunnel gateway and the terminal.

12. The method according to claim 11, wherein the VPN tunnel between the terminal and the security tunnel gateway is an HTTP tunnel;

before encapsulating the second service packet into the second tunnel packet, the method further comprises:

using an SSL tunnel key to encrypt the second service packet, wherein the SSL tunnel key is pre-negotiated between the terminal and the security tunnel gateway over the HTTP tunnel; and the step of encapsulating the second service packet into the second tunnel packet comprises:

encapsulating the encrypted packet into the second tunnel packet.

13. The method according to claim 9, wherein the method further comprises:

setting up the SSL tunnel with the security tunnel gateway firstly, and negotiating a UDP tunnel key with the security tunnel gateway over the SSL tunnel that has been set up, so as to set up the UDP tunnel.

14. The method according to claim 9, wherein the first service control information further comprises indication information of releasing the VPN tunnel.

15. The method according to claim 9, before receiving the first tunnel packet over a tunnel between the security tunnel gateway and the terminal, the method further comprises:

receiving a VPN tunnel setup request message sent by the terminal;

sending a VPN tunnel setup response message to the terminal;

receiving a configuration information request packet over the tunnel after the VPN tunnel is set up successfully;

sending configuration information to the terminal over the tunnel, the configuration information includes: an IP address of the network server, a mask of the network server, a virtual IP address allocated by the security tunnel gateway to the terminal and a mask allocated by the security tunnel gateway to the terminal.

16. A terminal, comprising a processor and a memory coupled to the processor;

wherein the processor is configured to:

construct a first service packet, including setting a source address of the first service packet as a virtual IP address allocated by an internet protocol multimedia subsystem (IMS) network to the terminal, and setting a destination address of the first service packet as an address of a network server in the IMS network, wherein the first service packet contains service data to be sent to the network server;

encapsulate the first service packet into a first tunnel packet, wherein a source IP address of the first tunnel packet is a real IP address of the terminal, and a destination IP address of the first tunnel packet is an IP address of a security tunnel gateway located at an edge of the IMS network; and send the first tunnel packet to the security tunnel gateway of the IMS network over a Virtual Private Network (VPN) tunnel between the terminal and the security tunnel gateway, for the security tunnel gateway to send the first service packet in the first tunnel packet to the network server;

wherein the VPN tunnel between the terminal and the security tunnel gateway is a User Datagram Protocol (UDP) tunnel; and when a Security Socket Layer (SSL) tunnel exists between the terminal and the security tunnel gateway additionally, the processor is further configured to:

send first service control information to the security tunnel gateway over the SSL tunnel, the first service control information comprises a request for allocating the virtual IP address;

and receive second service control information sent by the security tunnel gateway over the SSL tunnel, the second service control information comprises the virtual IP address allocated by the security tunnel gateway to the terminal.

17. The terminal according to claim 16, wherein the processor is further configured to:

receive a second tunnel packet over the tunnel, and decapsulate the second tunnel packet, wherein a source IP address of the second tunnel packet is the IP address of the security tunnel gateway, and a destination IP address of the second tunnel packet is the real IP address of the terminal;

extract the service data from a second service packet obtained as a result of decapsulation, wherein a source address of the second service packet is the address of the network server, and a destination address of the second service packet is the virtual IP address; and insert the extracted service data into a communication interface provided by an operating system, for the terminal to obtain the service data in the second service packet from the communication interface provided by the operating system.

18. The terminal according to claim 16, wherein the processor is further configured to:
set up the SSL tunnel; and
negotiate a UDP tunnel key with the security tunnel gateway over the SSL tunnel that has been set up, so as to set up the UDP tunnel.

19. A security tunnel gateway, located at an edge of an Internet Protocol Multimedia Subsystem (IMS) network, comprising:
a processor and a memory coupled to the processor;
wherein the processor is configured to:
receive a first tunnel packet over a Virtual Private Network (VPN) tunnel between the security tunnel gateway and a terminal in a private network, wherein a source IP address of the first tunnel packet is a real IP address of the terminal, and a destination IP address of the first tunnel packet is an IP address of the security tunnel gateway;
decapsulate the first tunnel packet; and
send the first service packet obtained as a result of decapsulation to a network server in the IMS network, wherein a source address of the first service packet is a virtual IP address, and a destination address of the first service packet is an address of the network server, wherein the virtual IP address is an address allocated by the IMS network to the terminal;
wherein the VPN tunnel between the terminal and the security tunnel gateway is a User Datagram Protocol (UDP) tunnel; and
when an Security Socket Layer (SSL) tunnel exists between the terminal and the security tunnel gateway additionally, the processor is further configured to:
receive first service control information sent by the terminal over the SSL tunnel, the first service control information comprises a request for allocating the virtual IP address; and
send second service control information to the terminal over the SSL tunnel, the second service control information comprises the virtual IP address allocated by the security tunnel gateway to the terminal.

20. The security tunnel gateway according to claim 19, wherein the processor is further configured to:
receive a second service packet sent by the network server, wherein a source address of the second service packet is the address of the network server, and a destination address of the second service packet is the virtual IP address;
encapsulate the second service packet into a second tunnel packet, wherein a source IP address of the second tunnel packet is the IP address of the security tunnel gateway, and a destination IP address of the second tunnel packet is the real IP address of the terminal; and
send the second tunnel packet to the terminal over the VPN tunnel between the security tunnel gateway and the terminal.

21. An Internet Protocol Multimedia Subsystem (IMS) network system, comprises a security tunnel gateway located at an edge of the IMS network and a network server, wherein the security tunnel gateway is configured to:
receive a first tunnel packet over a virtual private network (VPN) tunnel between the security tunnel gateway and a terminal located in a private network, wherein a source IP address of the first tunnel packet is a real IP address of the terminal, and a destination IP address of the first tunnel packet is an IP address of the security tunnel gateway;
decapsulate the first tunnel packet to obtain a first service packet, wherein a source address of the first service packet is a virtual IP address, and a destination address of the first service packet is an address of the network server, wherein the virtual IP address is an address allocated by the IMS network to the terminal;
send the first service packet to the network server; receive a second service packet sent by the network server, wherein a source address of the second service packet is the address of the network server, and a destination address of the second service packet is the virtual IP address;
encapsulate the second service packet into a second tunnel packet, wherein a source IP address of the second tunnel packet is the IP address of the security tunnel gateway, and a destination IP address of the second tunnel packet is the real IP address of the terminal; and
send the second tunnel packet to the terminal over the tunnel between the security tunnel gateway and the terminal;
wherein the VPN tunnel between the terminal and the security tunnel gateway is a User Datagram Protocol (UDP) tunnel; and when an Security Socket Layer (SSL) tunnel exists between the terminal and the security tunnel gateway additionally, the security tunnel gateway is further configured to:
receive first service control information sent by the terminal over the SSL tunnel, the first service control information comprises a request for allocating the virtual IP address; and
send second service control information to the terminal over the SSL tunnel, the second service control information comprises the virtual IP address allocated by the security tunnel gateway to the terminal; and
the network server is configured to receive the first service packet sent by the security tunnel gateway, and send the second service packet to the security tunnel gateway.

* * * * *